(12) United States Patent
Navarro

(10) Patent No.: US 7,052,227 B2
(45) Date of Patent: May 30, 2006

(54) DRIVE MECHANISM FOR A VEHICLE ACCESS SYSTEM

(75) Inventor: Sebastian Garcia Navarro, Gerona (ES)

(73) Assignee: The Braun Corporation, Winamac, IN (US)

(*) Notice: Subject to any disclaimer, the term of this patent is extended or adjusted under 35 U.S.C. 154(b) by 598 days.

(21) Appl. No.: 10/056,745

(22) Filed: Jan. 25, 2002

(65) Prior Publication Data

US 2002/0110444 A1 Aug. 15, 2002

Related U.S. Application Data

(60) Provisional application No. 60/264,279, filed on Jan. 26, 2001.

(51) Int. Cl.
*E01D 1/00* (2006.01)
*B60P 1/00* (2006.01)

(52) U.S. Cl. .................................. 414/537; 424/921
(58) Field of Classification Search .............. 414/537, 414/430, 571, 426, 921, 530, 540
See application file for complete search history.

(56) References Cited

U.S. PATENT DOCUMENTS

| | | |
|---|---|---|
| 4,058,228 A | 11/1977 | Hall |
| 4,134,504 A | 1/1979 | Salas et al. |
| 4,685,858 A | 8/1987 | Manning et al. |
| 4,759,682 A | 7/1988 | Hood |
| 4,778,328 A | 10/1988 | Apgar |
| 4,827,548 A | 5/1989 | Hood |
| 4,850,788 A | 7/1989 | Dickson |
| 4,909,700 A | 3/1990 | Fontecchio et al. |
| 4,950,123 A | 8/1990 | Brockhaus |
| 4,958,979 A | 9/1990 | Svensson |
| 5,110,252 A | 5/1992 | Aoki |
| 5,111,912 A | 5/1992 | Kempf |
| 5,133,634 A | 7/1992 | Gingrich et al. |
| 5,160,236 A | 11/1992 | Redding et al. |
| 5,186,282 A | 2/1993 | Everhard et al. |
| 5,199,150 A | 4/1993 | Mortenson |
| 5,253,973 A | 10/1993 | Fretwell |
| 5,257,894 A | 11/1993 | Grant |
| 5,305,486 A | 4/1994 | Smith et al. |
| 5,331,701 A | 7/1994 | Chase et al. |
| 5,340,267 A | 8/1994 | Stoll et al. |

(Continued)

FOREIGN PATENT DOCUMENTS

| | | |
|---|---|---|
| DE | 41 34 559 A1 | 4/1993 |
| EP | 0 629 524 A1 | 12/1994 |
| EP | 0 446 224 B1 | 1/1996 |
| EP | 0 703 766 B1 | 3/1996 |
| ES | 2 137 856 A1 | 12/1999 |
| GB | 2 224 992 B | 4/1990 |
| WO | WO 99/12506 | 3/1999 |

*Primary Examiner*—Emmanuel Marcelo
*Assistant Examiner*—Evan Langdon
(74) *Attorney, Agent, or Firm*—Michael Best & Friedrich LLP

(57) ABSTRACT

An access system for passenger boarding of a vehicle is provided. The access system includes a frame mounted to the vehicle. A transfer member is movably mounted in the frame. The transfer member is movable with respect to the frame between a stowed position and a deployed position with respect to the vehicle. A first drive assembly is positioned along a first side of the frame and a second drive assembly is positioned along a second side of the frame. A linking member extends between and connects the first drive assembly with the second drive assembly. There is further provided a control assembly that is engageable to at least one of the linking member, the first drive assembly, and the second drive assembly to allow operator selection of a manual or automatic mode for deploying and stowing the transfer member.

25 Claims, 11 Drawing Sheets

U.S. PATENT DOCUMENTS

| | | |
|---|---|---|
| 5,357,869 A | 10/1994 | Barjolle et al. |
| 5,380,144 A | 1/1995 | Smith et al. |
| 5,393,192 A | 2/1995 | Hall et al. |
| 5,556,250 A | 9/1996 | Fretwell et al. |
| 5,636,399 A | 6/1997 | Tremblay et al. |
| 5,676,515 A | 10/1997 | Haustein |
| 5,775,232 A | 7/1998 | Golemis et al. |
| 5,795,125 A | 8/1998 | Walkden |
| 5,815,870 A | 10/1998 | Deutch et al. |
| 5,832,555 A | 11/1998 | Saucier et al. |
| 5,871,329 A | 2/1999 | Tidrick et al. |
| 5,975,830 A | 11/1999 | Goodrich et al. |
| 6,010,298 A | 1/2000 | Cohn et al. |
| 6,039,528 A | 3/2000 | Cohn |
| 6,102,648 A | 8/2000 | Fretwell et al. |
| 6,435,804 B1 * | 8/2002 | Hutchins .................... 414/546 |

* cited by examiner

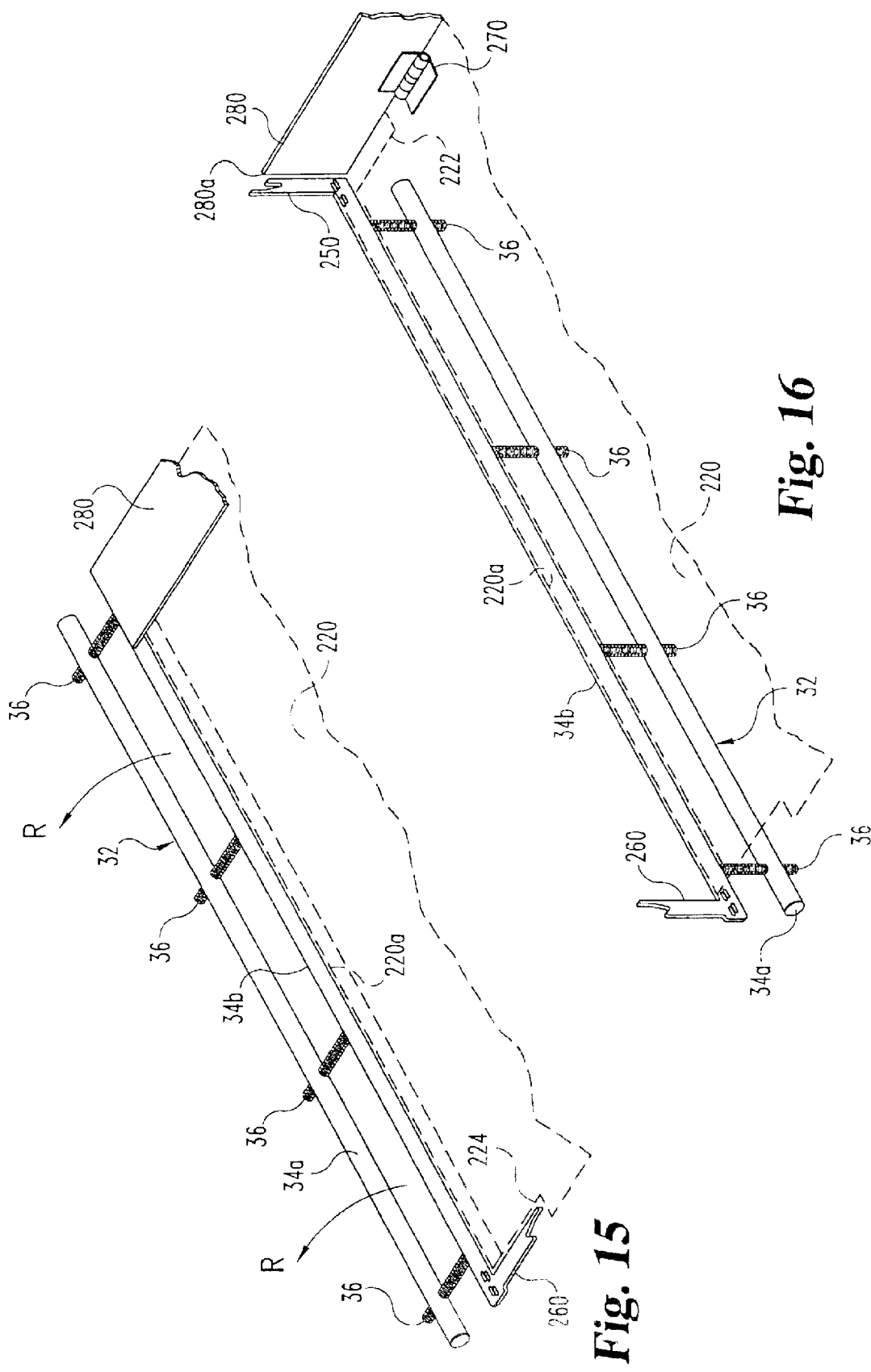

DRIVE MECHANISM FOR A VEHICLE ACCESS SYSTEM

CROSS-REFERENCE TO RELATED APPLICATION

This application claims the benefit of the filing date of Provisional Application No. 60/264,279, filed Jan. 26, 2001.

BACKGROUND OF THE INVENTION

The present invention relates generally to the field of vehicle access systems, and more particularly to drive mechanisms for deploying and stowing a transfer member of a vehicle access system.

There are many types of drive mechanisms known to deploy and stow ramps, lift platforms and other transfer members that provide wheelchair access to vehicles. One type of drive mechanism is described in U.S. Pat. No. 6,102,648 to Fretwell et al. Another example is provided in U.S. Pat. No. 5,393,192 to Hall et al.

While various drive mechanisms for extending and retracting transfer members from vehicles are known, there remains a need for improvements in the art. For example, there remains a need for improved vehicle access systems that deploy and stow the transfer member while also maintaining its alignment. There also remains a need for vehicle access systems that allow a transfer member to be manually stowed while maintaining alignment of the transfer member within its frame. Furthermore, there is a need for vehicle access systems that employ multiple drive assemblies for deploying and stowing a transfer member in both automatic and manual modes. The present invention is directed towards meeting these needs, among others.

SUMMARY OF THE INVENTION

One aspect of the present invention is directed to a vehicle access system which includes a transfer member that provides wheelchair access to a vehicle. The transfer member is coupled to a pair of drive assemblies that are interconnected by a linking member and provide a concentric driving force to move the transfer member between its stowed and deployed positions.

In one form, the interconnected drive assemblies are maintained simultaneously in either an automatic mode or a manual mode to deploy or stow the transfer member. In a further form, a locking member is provided that allows operator selection of the automatic mode or the manual mode. The locking member can be selectively engageable to one of the drive assemblies and the linking member in order to select the driving mode desired.

In another aspect of the present invention, a vehicle access system is provided. The access system includes a frame having opposite first and second sides extending between an inboard end and an outboard end. A transfer member having an inboard end and an outboard end is movably supported by the frame. The system further includes a first drive assembly positioned adjacent the first side of the frame and a second drive assembly positioned adjacent the second side of the frame. A linking member extends between and connects the first drive assembly with the second drive assembly. A control assembly is selectively engageable to at least one of the linking member, the first drive assembly, and the second drive assembly. The first drive assembly and the second drive assembly are operable to move the transfer member with respect to the frame between a stowed position whereby the transfer member is positioned substantially in the vehicle, and an deployed position whereby the transfer member extends outwardly from the vehicle.

In a further aspect of the present invention, the first and second drive assemblies each include a chain mounted to the frame and a motor coupled to the chain The chains are fixed and the motors are movable along their respective chain when the locking member is engaged. The linking member includes a chain extending between and connecting the first drive assembly to the second drive assembly. A first double sprocket connects the first chain of the first drive assembly to the chain of the linking member, and a second double sprocket connects the second chain of the second drive assembly to the chain of the linking member. The control assembly can include a locking member that is selectively engageable to one the first and second double sprockets. The transfer member can be manually moved between the extended and retracted position when the control assembly is disengaged.

In another aspect of the present invention, the access system includes a carriage attached to the inboard end of the transfer member that is movable in the frame. The first drive assembly and the second drive assembly include a first motor and a second motor, respectively, mounted in the carriage. The first drive assembly includes a first chain mounted to the frame with the first motor coupled thereto. The first chain is fixed and the first motor is movable along the first chain when the locking member is engaged. The second drive assembly includes a second chain mounted to the frame with the second motor coupled thereto. The second chain is fixed and the second motor is movable along the second chain when the locking member is engaged.

In one form, the access system includes means for raising the inboard end of the transfer member. The access system includes a carriage movable in the frame that is attached to the inboard end of the transfer member. The means for raising includes a rocker assembly pivotally attached to and extending between an outboard end of the carriage and the inboard end of the transfer member.

In another aspect of the present invention, a vehicle access system is provided. The system includes a frame having opposite first and second sides extending between an inboard end and an outboard end. A transfer member having an inboard end and an outboard end is movably mounted to the frame. A first drive assembly is positioned towards the first side of the frame. The first drive assembly includes a first chain and a first motor coupled to the first chain. A second drive assembly is positioned towards the second side of the frame. The second drive assembly includes a second chain and a second motor coupled to the second chain. A linking member extends between and connects the first drive assembly with the second drive assembly. The first drive assembly and the second drive assembly are operable to move the transfer member with respect to the frame between a retracted position whereby the transfer member is positioned substantially in the vehicle and an extended position whereby the transfer member extends outwardly from the vehicle.

In one form, the vehicle access system also includes a control assembly selectively engageable to the linking assembly. When the control assembly is disengaged, the transfer member is manually movable between the extended and retracted positions. In another preferred form, the first motor is movable along the first chain and the second motor is movable along the second chain to move the transfer member between the extended and retracted positions when the locking member is engaged to the linking assembly. In another form, the first chain and the second chain form first and second loops, respectively, that are oriented parallel to the frame. In a further form, the linking member is a chain extending along the inboard end of said frame connecting the first drive assembly and the second drive assembly.

In a further aspect of the invention, an access system for passenger boarding of a vehicle is provided. The system includes a frame mounted to the vehicle. The frame includes opposite first and second sides extending between an inboard end and an outboard end of the frame. A transfer member having an inboard end and outboard end is movably mounted to the frame. A first drive assembly is positioned towards the first side of the frame and a second drive assembly is positioned towards the second side of the frame. A chain is provided along the inboard end of the frame extending between and connecting the first drive assembly with the second drive assembly. The transfer member is movable with respect to the frame by the first and second drive assemblies between a retracted position whereby the transfer member is positioned substantially in the vehicle and an extended position whereby the transfer member extends outwardly from the vehicle.

In one form, the transfer member has a central axis extending between its inboard end and its outboard end. The first drive assembly and the second drive assembly are each spaced an equal distance from the central axis on opposite sides thereof. In another form, the first drive assembly includes a first chain mounted to the frame and a first motor coupled to the first chain. The first chain is fixed and the first motor is movable along the first chain when the locking member is engaged, and the second drive assembly includes a second chain mounted to the frame and a second motor coupled to the second chain. The second chain is fixed and the second motor is movable along the second chain when the locking member is engaged. It is also contemplated that the access system can include a first double sprocket that connects the first chain of the first drive assembly to the chain of the linking member, and a second double sprocket that connects the second chain of the second drive assembly to the chain of the linking member.

In still another aspect of the present invention, an apparatus for deploying and stowing a transfer member of a vehicle access system is provided. The apparatus includes a first drive assembly having a first chain forming a substantially horizontal loop about a first plurality of sprockets and a first motor engaged thereto. The apparatus further includes a second drive assembly having a second chain forming a substantially horizontal loop about a second plurality of sprockets and a second motor engaged thereto. A linking member interconnects the first and second drive assemblies. A control assembly is selectively engageable to one of the first drive assembly, the second drive assembly, and the linking member. The first and second drive assemblies are operable to move the transfer member between a stowed position whereby the transfer member is positioned substantially in the frame and a deployed position whereby the transfer member extends outwardly from the frame. When the control assembly is engaged, the first and second motors move along the first and second chains respectively. When the control assembly is disengaged, the first and second chains rotate about the first and second plurality of sprockets respectively.

These and other aspects, forms, features, embodiments, objects and advantages of the present invention will be apparent from the following detailed description of the illustrated embodiments.

BRIEF DESCRIPTION OF THE DRAWINGS

FIG. 15 is a partial perspective view of the inboard end of the ramp of the vehicular access system of FIG. 11 with the ramp in the deployed position and one of the side barriers in the stowed orientation and the other side barrier removed.

FIG. 16 is a partial perspective view of the inboard end of the ramp of the vehicular access system of FIG. 11 with the ramp in the vehicle floor level position and one of the side barriers in the raised safety barrier orientation and the other side barrier removed.

DESCRIPTION OF THE ILLUSTRATED EMBODIMENTS

Figure 1:
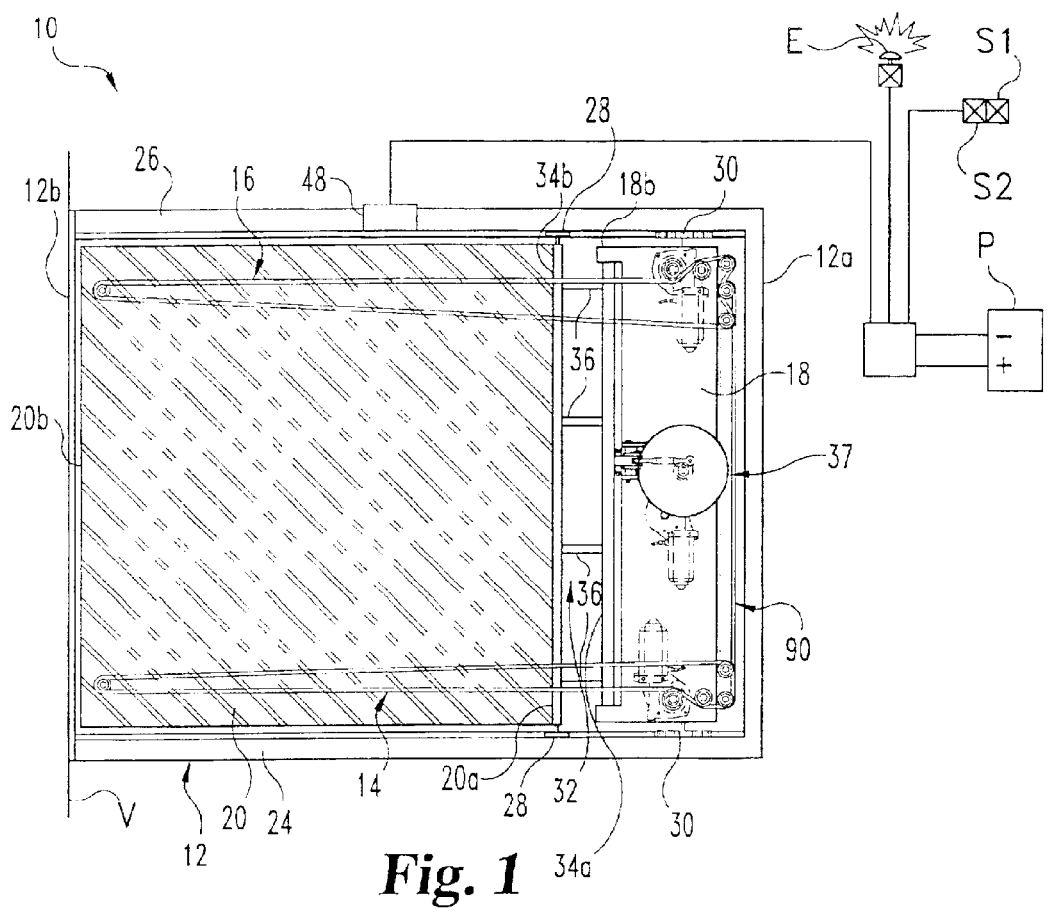
FIG. 1 is a bottom plan view of a vehicle access system according to the present invention with a ramp in a stowed position along with a control schematic for operation of the same.
Figure 2:
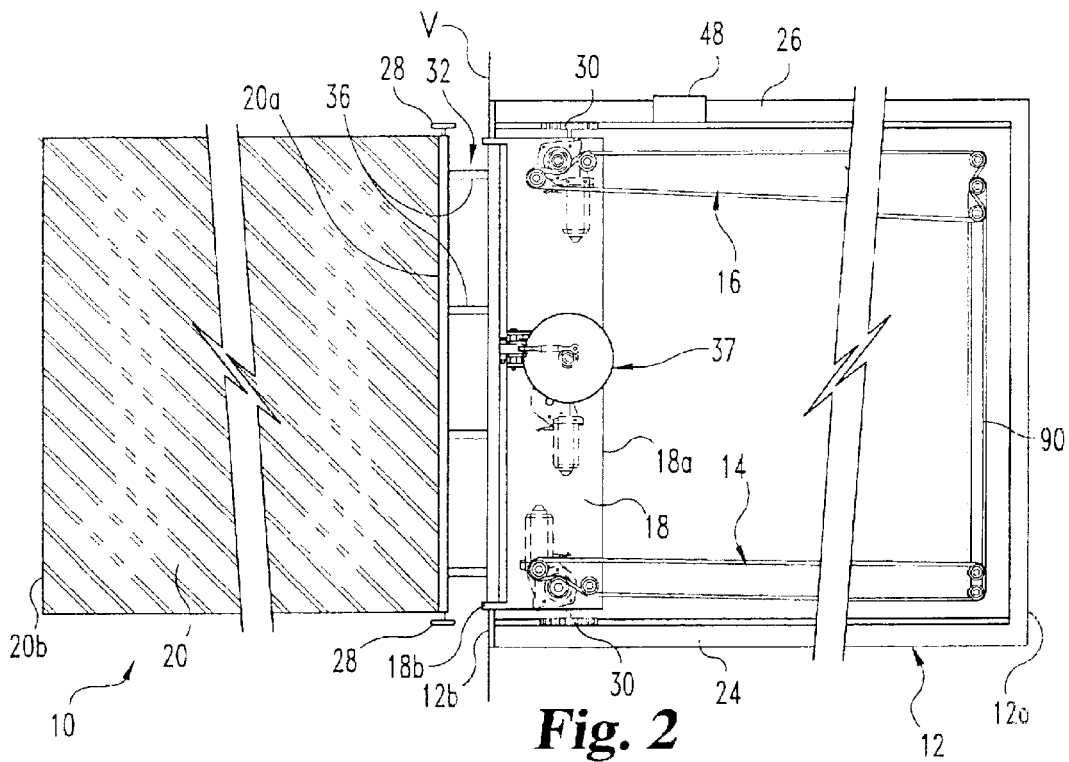
FIG. 2 is a bottom plan view of the vehicle access system of FIG. 1 with the ramp in a deployed position.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations or modifications of the illustrated devices or further applications of the principles of the invention illustrated herein that would occur to one skilled in the art to which the invention relates are contemplated as within the scope of the invention.

Figure 3:
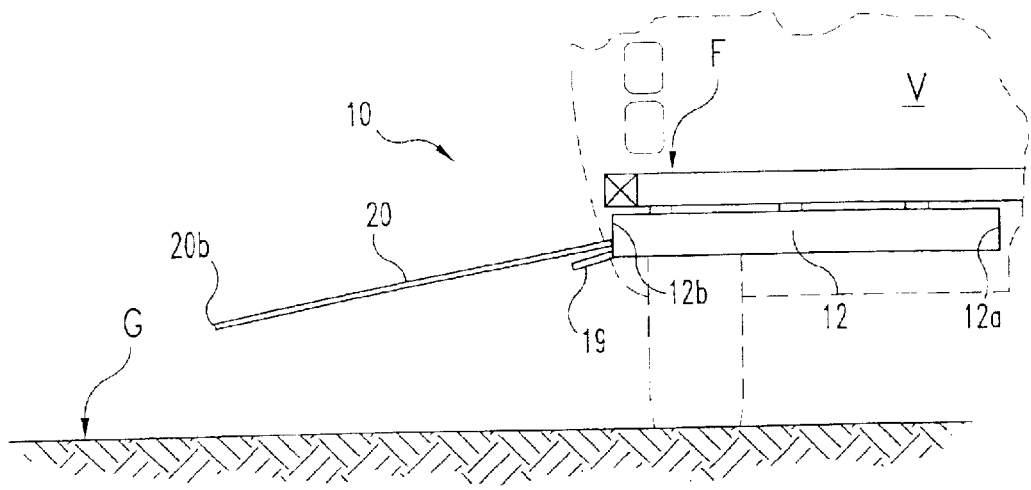
FIG. 3 is a side elevation view of the vehicle access system of FIG. 1 with the ramp partially extended from the vehicle.
Figure 4:
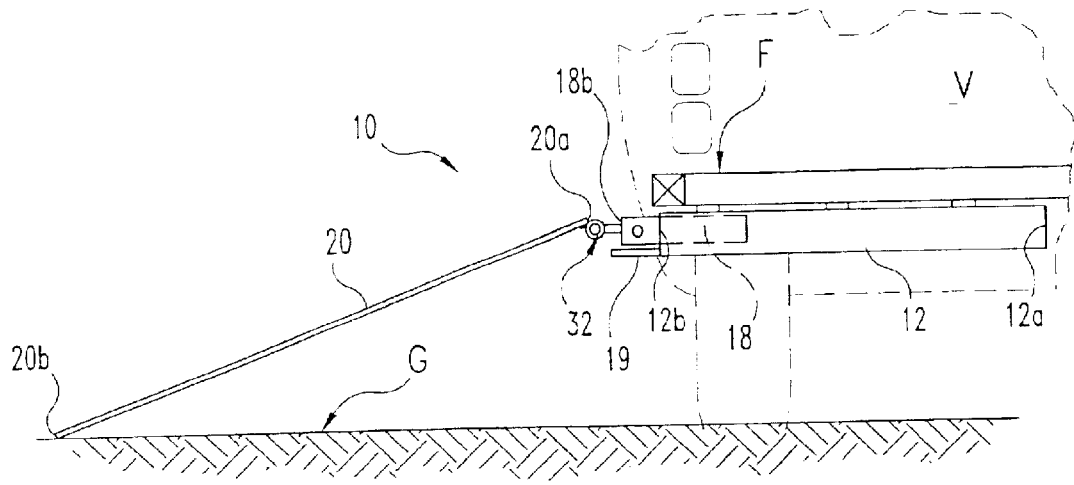
FIG. 4 is a side elevation view of the vehicle access system of FIG. 1 with the ramp fully extended from the vehicle.
Figure 5:
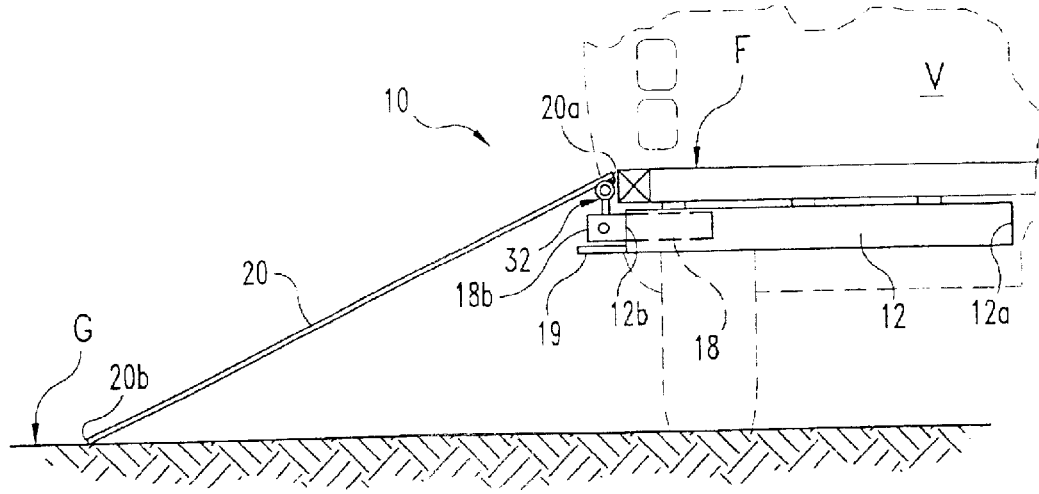
FIG. 5 is a side elevation view of the vehicle access system of FIG. 1 with the ramp fully extended from the vehicle and the inboard end of the ramp raised to the floor of the vehicle.

Referring now to FIGS. 1–7, there is illustrated a vehicle access system 10 according to the present invention. Vehicle access system 10 includes a frame 12 having an inboard end 12a and an outboard end 12b. Frame 12 can be mounted to a vehicle V below the vehicle floor F (FIGS. 3–5), below the frame, or in any other position that may occur to those skilled in the art. Outboard end 12b preferably faces a direction from which vehicle V is to be accessed. For example, outboard end 12b may face the side of a vehicle V (FIGS. 3–5.) Outboard end 12b may also face any other position, such as, for example, the rear of a vehicle, such as would occur to one skilled in the art.

A transfer member is movably mounted to the frame 12 and is sized to provide wheelchair access to the vehicle V from the ground G (FIGS. 3–5.) In the illustrated embodiment, the transfer member is in the form of a ramp 20 that is moveably mounted within frame 12. While the transfer member is illustrated and described herein with reference to ramp 20, it should be understood that principles of the present invention also have application with other types of transfer members, such as, for example, a platform for a wheelchair lift. It should further be understood that the drawings of FIGS. 3–5 are not to scale and that both ramp 20 and carriage 18 are sized to fit within frame 12 in the stowed position.

Access system 10 includes a first drive assembly 14 and a second drive assembly 16 interconnected by a linking member 90 (see FIGS. 1, 2, 6 and 7.) A control assembly 100 is provided to allow selection of the automatic mode or the manual mode. Control assembly 100 is preferably engaged to a portion of the first drive assembly 14 to select the automatic mode of operation and disengaged from that portion to select the manual mode of operation. Linking member 90 connects first drive assembly 14 to second drive assembly 16, and control assembly 100 may alternatively engage and disengage a portion of the linking member 90 or drive assembly 16 to select the automatic and manual modes. In any engaged configuration, linking member 90 maintains drive assemblies 14 and 16 simultaneously in an automatic mode for deploying and stowing ramp 20 using drive motors 52 and 72, respectively. When disengaged, linking member 90 maintains drive assemblies 14, 16 in a manual mode for deploying and stowing the ramp 20 using manual force as may be required, for example, if power to drive motors 52 and 72 is interrupted.

Frame 12 has a first side rail 24 and a second side rail 26 in which wheels 28 of ramp 20 and wheels 30 of carriage 18 are mounted and movable therealong. Ramp 20 has an inboard end 20a and an opposite outboard end 20b. Similarly, carriage 18 has an inboard end 18a and an outboard end 18b. Inboard end 20a of ramp 20 is hingedly attached to outboard end 18b of carriage 18 by a rocker assembly 32. Ramp 20 and carriage 18 are movable within frame 12 between the stowed position (FIG. 1) and the deployed position, (FIG. 2) by first drive assembly 14 and second drive assembly 16.

Drive motors 52 and 72 of drive assemblies 14 and 16 are powered by a power source P (FIG. 1) which can be the power unit of the vehicle or a separate power unit. An operator can automatically stow and/or deploy the ramp 20 by selecting deploy and stow switches S1 and S2 which are operatively connected to control module 48. An emergency stop switch E is also operatively connected to control module 48 in order to stop automatic deployment and/or stowing of ramp 20. The operative connection from power unit P, deploy and stow switches S1 and S2 and control switch E to control module 48 can be accomplished through hardwired connections, radio frequency transmission or any other signal transmission technique known in the art. Control module 48 is connected to a power cable 46 which is electrically coupled to drive motor 52 of first drive assembly 14, drive motor 72 of second drive assembly 16 and to lift motor 44 of lifting mechanism 37. Power cable 46 is preferably flexible so it travels along with ramp 20 and carriage 30 without kinking or binding as they move inboard and outboard relative to frame 12. Sensors (not shown) are preferably provided at or near inboard end 12a and outboard end 12b of frame 12 in order to automatically stop movement of ramp 20 when it is fully deployed or stowed and to sequence operation of drive assemblies 14 and 16 with lifting mechanism 37. The sensors may be contact sensors, optical sensors, magnetic sensors or any other sensors known in the art.

Figure 6:
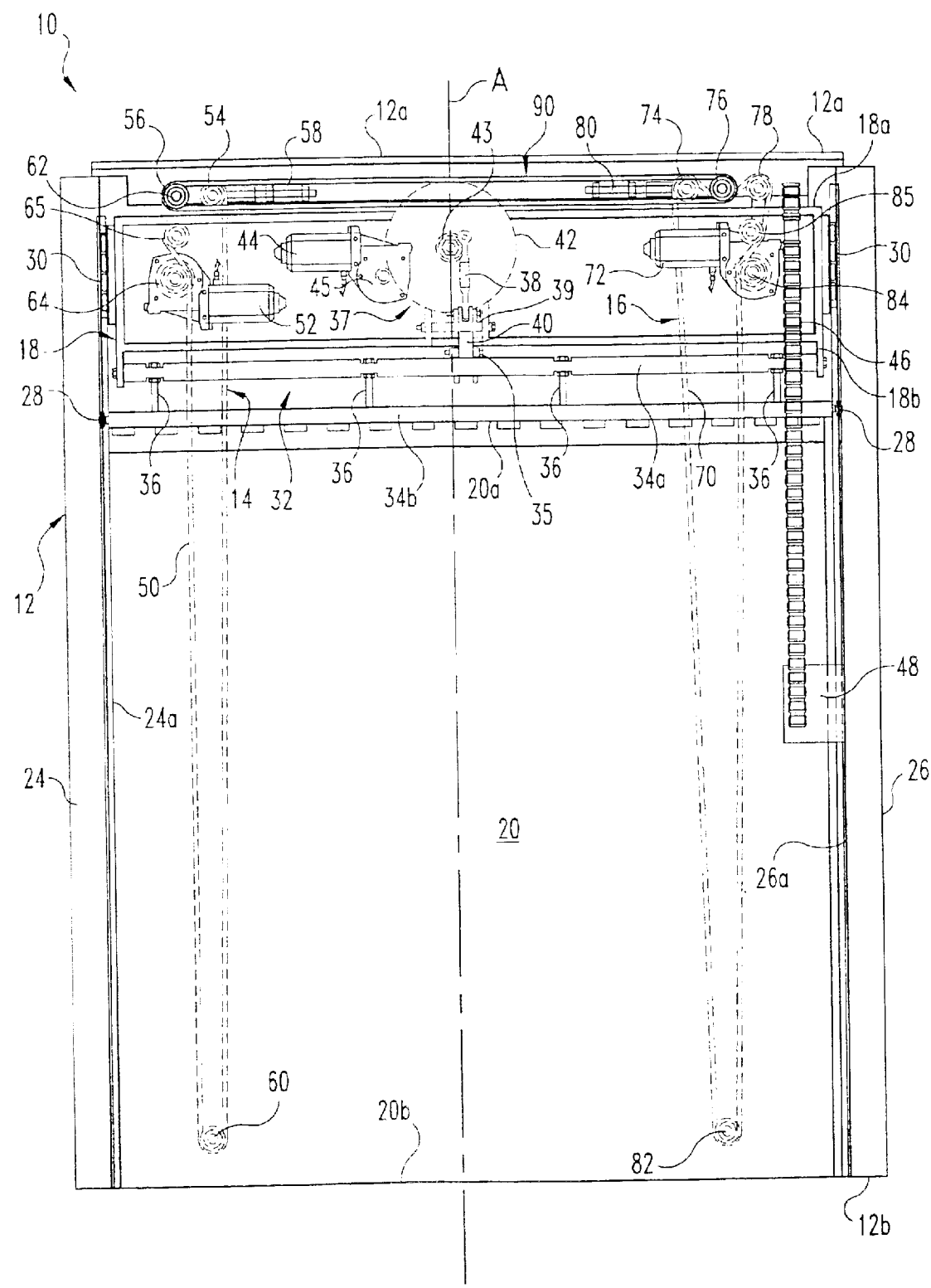
FIG. 6 is an enlarged top plan view of the vehicle access system of FIG. 1 with the ramp in the stowed position.
Figure 7:
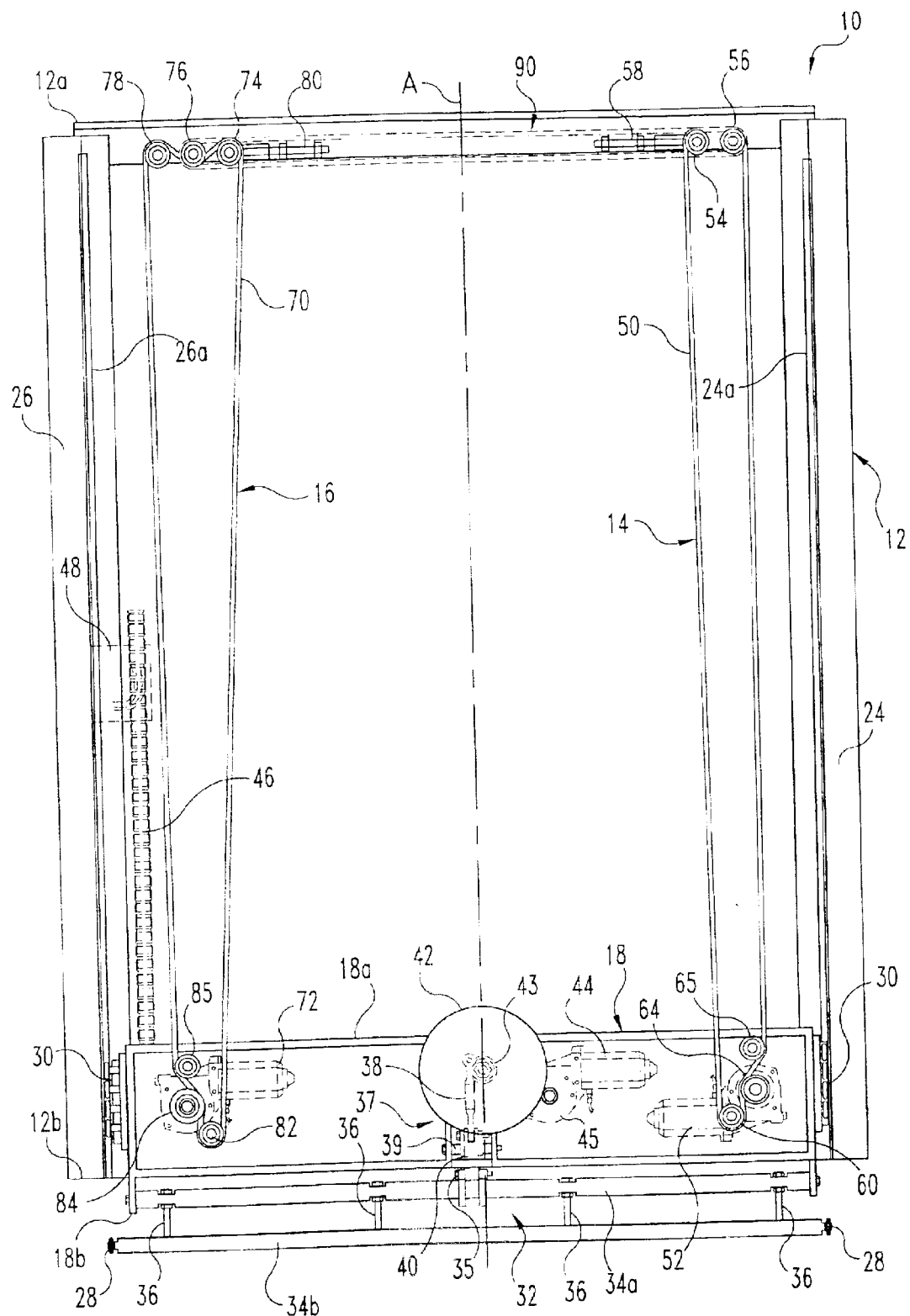
FIG. 7 is an enlarged bottom plan view of the vehicle access system of FIG. 1 with the ramp removed and the drive assemblies located in the deployed position.

As best shown in FIGS. 6 and 7, rocker assembly 32 extends between and is pivotally attached to inboard end 20a of ramp 20 and outboard end 18b of carriage 18. Rocker assembly 32 includes first rocker shaft 34a rotatably connected to the outboard end 18b of carriage 18 and second rocker shaft 34b rotatably connected to the inboard end 20a of ramp 20. Rocker shafts 34a and 34b are interconnected by a number of struts 36 extending therebetween. The length of struts 36 is preferably adjustable to accommodate differing elevations between the floor F of vehicle V and frame 12. When ramp 20 has been fully extended from the vehicle V, outboard end 20b of ramp 20 is on or near ground G, but inboard end 20a of ramp 20 is below the level of floor F (FIG. 4.) From this position lifting mechanism 37 is operable to rotate rocker assembly 32 about first rocker shaft 34a to thereby raise inboard end 20a of ramp 20 to the level of floor F of vehicle V providing a smooth transition surface (FIG. 5.)

Referring now to FIGS. 4, 5, 6 and 7, further details of lifting mechanism 37 will be described. Lifting mechanism 37 includes a bi-directional lift motor 44 mounted in carriage 18 and operable to rotate a pinion 45 connected to the drive shaft (not shown) of motor 44. Pinion 45 is located below motor 44 and engages lift gear 42. Lift gear 42 is rotatably mounted adjacent to the lower surface of carriage 18 and is driven in a clockwise or counterclockwise direction by motor 44 via pinion 45. Hub 43 is mounted concentrically to lift gear 42 and rotates therewith. Lifting mechanism 37 further includes a lift arm 38 that is pivotally connected at one end to hub 43 at a location spaced away from the center of hub 43 and pivotally connected at its opposite end to a yoke 40 at one end of yoke 40. A spacer 39 provides a connection between yoke 40 and carriage 18 while permitting the rocking motion of yoke 40. Yoke 40 extends from its connection with lift arm 38 and spacer 39 to a connector 35 that is attached to first rocker shaft 34a.

The pivotal connections of lift arm 38 permit lift arm 38 to translate the rotational motion of hub 43 in a plane of rotation substantially parallel to the bottom surface of carriage 18 to the rocking motion of yoke 40 in a substantially perpendicular plane of motion. Connector 35 translates the rocking motion of yoke 40 into the rotational motion of rocker shaft 34a about its longitudinal axis which, in turn, raises inboard end 20a of ramp 20 to the level of floor F of vehicle V as previously described.

When lift motor 44 is activated to raise inboard end 20a of ramp 20, pinion 45 drives lift gear 42 and rotates hub 43 in a counter-clockwise direction (FIG. 7.) This rotation moves lift arm 38 towards inboard end 20a of ramp 20. The motion of lift arm 38 rocks yoke 40 towards inboard end 20a of ramp 20, thereby causing lower rocker shaft 34a to rotate about its own longitudinal axis at outboard end 18b of carriage 18 and raise struts 36, upper rocker shaft 34b, and inboard end 20a of ramp 20 from their initial position (FIG. 4) to the floor level F of vehicle V (FIG. 5.) Lift motor 44 is reversed to cause pinion 45 to drive lift gear 42 and rotate hub 43 in a clockwise direction (FIG. 7.) This moves lift arm 38 away from inboard end 20a of ramp 20, rocks yoke 40 away from inboard end 20a of ramp 20, and returns inboard end 20a of ramp 20 to its initial position (FIG. 4.)

The operation of drive assemblies 14 and 16 and linking member 90 will now be further described. Side rails 24, 26 of frame 12 include inwardly facing C-shaped portions 24a and 26a sized to received wheels 28 of ramp 20 and wheels 30 of carriage 18. Carriage 18 and ramp 20 are connected to one another by rocker assembly 32, and move together along frame 12 in response to driving forces applied by first drive assembly 14 and second drive assembly 16.

First drive assembly 14 includes a first bi-directional drive motor 52 mounted in carriage 18 and moveable therewith between a stowed positioned (FIG. 6) and a deployed position (FIG. 7.) First drive assembly 14 also includes a first drive chain 50. First drive motor 52 includes a drive gear 64 that is operatively coupled to drive chain 50 to apply a force thereto when motor 52 is powered on. A tension sprocket 65 is rotatably mounted to carriage 18 and maintains chain 50 in contact with drive gear 64. First outboard sprocket 60 is rotatably mounted to frame 12 adjacent outboard end 12b. First inboard sprocket 54 and first double sprocket 56 are each rotatably mounted to frame 12 adjacent inboard end 12a. In the illustrated embodiment, double sprocket 56 is positioned between side rail 24 and first inboard sprocket 54. Chain 50 is looped around first outboard sprocket 60, first inboard sprocket 54, and lower cog 56a of a first double wheeled sprocket 56. A tension adjuster 58 is secured to first inboard sprocket 54 to maintain chain 50 in a taut condition.

Second drive assembly 16 includes a second bi-directional drive motor 72 mounted in carriage 18 and moveable therewith between a stowed position (FIG. 6) and a deployed positions (FIG. 7.) Second drive assembly 16 also includes a second drive chain 70. Second drive motor 72 includes drive gear 84 that is operatively coupled to second drive chain 70 to apply a force thereto when motor 72 is powered on. Tension sprocket 85 is rotatably mounted to carriage 18 and maintains chain 70 in contact with drive gear 84. Second outboard sprocket 82 is rotatably mounted to frame 12 adjacent outboard end 12b. Second inboard sprocket 74, second double sprocket 76, and reversing sprocket 78 are rotatably mounted to frame 12 adjacent inboard end 12a. In the illustrated embodiment, second double wheeled sprocket 76 is positioned between second inboard sprocket 74 and reversing sprocket 78, and reversing sprocket 78 is positioned between second double wheeled sprocket 76 and side rail 26. A tension adjuster 80 is secured to second inboard sprocket 74 to maintain chain 70 in a taut condition.

Chain 70 is looped around second outboard sprocket 82, second inboard sprocket 74, reversing sprocket 78 and second double wheeled sprocket 76. In order to permit manual deployment and stowing of ramp 20, chain 70 extends around the outboard side of a lower cog 76a of second double wheeled sprocket 76 thereby permitting both double wheeled sprockets 56 and 76 to rotate in the same direction along with linking member 90 during manual deployment and stowing.

Linking member 90 interconnects first drive assembly 14 with second drive assembly 16. Linking member 90 is in the form of a loop chain which is connected around upper cog 56b of first double sprocket 56 and around upper cog 76b of second double sprocket 76. Drive chain 50 is connected around lower cog 56a of double sprocket 56 and also around first inboard sprocket 54 and first outboard sprocket 60, which lie in generally the same horizontal plane as lower cog 56a. Drive chain 70 is connected around lower cog 76a of second double sprocket 76 and also around second inboard sprocket 74, reversing sprocket 78, and second outboard sprocket 82, which lie in generally the same horizontal plane as lower cog 76a. Although other orientations are contemplated, drive chains 50 and 70 and linking member 90 are oriented horizontally in the illustrated embodiment to allow the overall height of frame 12 to be reduced.

Figure 8:
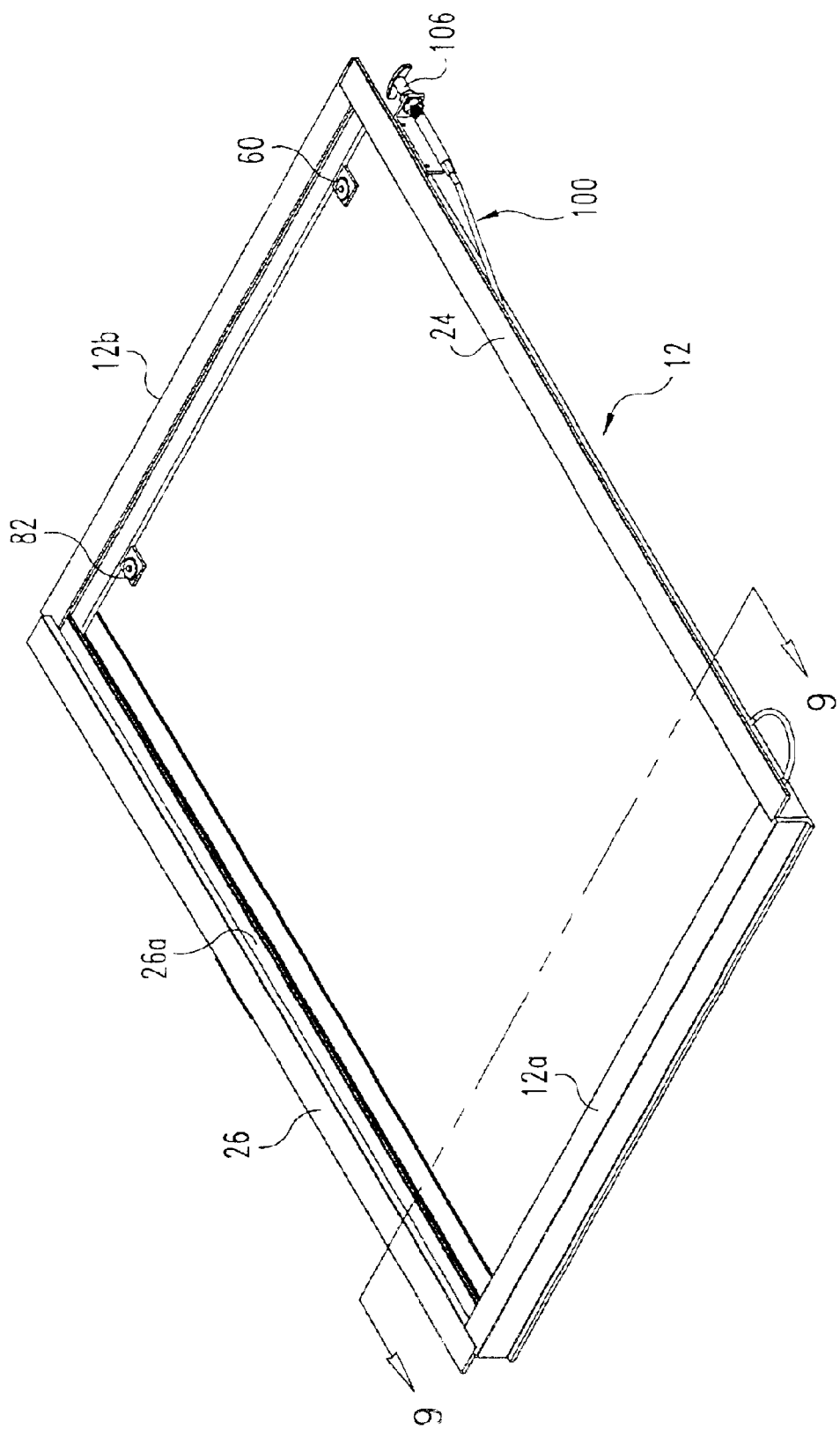
FIG. 8 is a perspective view of the frame of the vehicle access system of FIG. 1 with the ramp, carriage and drive assemblies removed therefrom.
Figure 9:
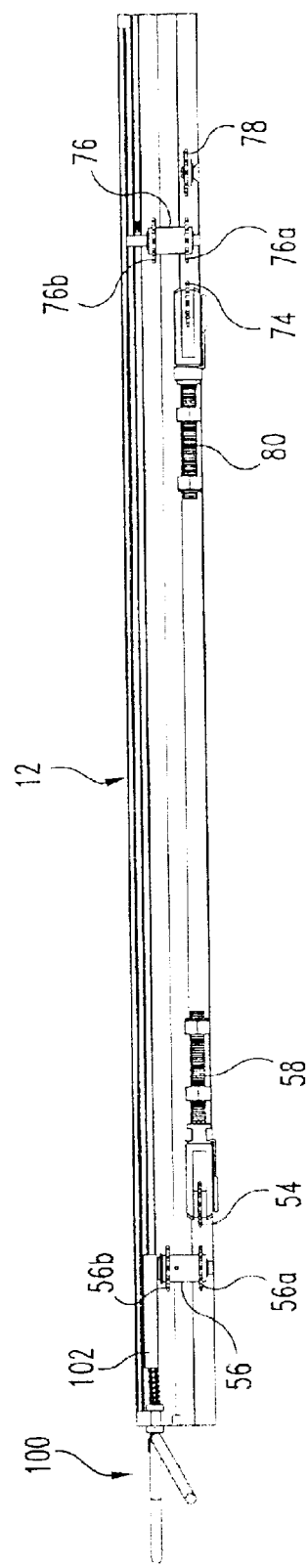
FIG. 9 is a sectional view taken through line 9—9 of FIG. 8.
Figure 10:
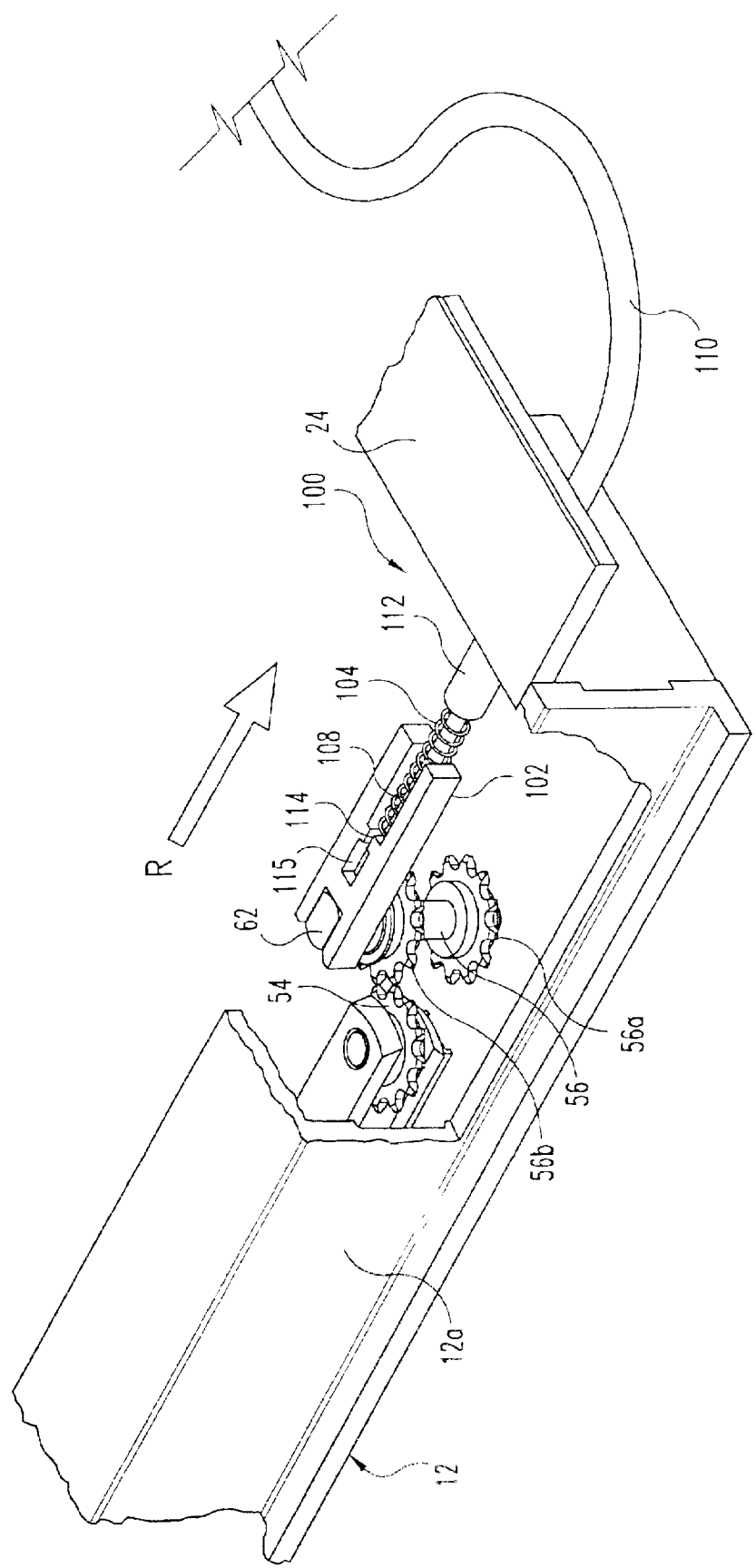
FIG. 10 is an enlarged detailed perspective view of a portion of a control assembly of the vehicle access system of FIG. 1 with a portion of the frame cutaway.

Referring now additionally to FIGS. 8–10, control assembly 100 is engageable to one of the first drive assembly 14, the second drive assembly 16, or linking member 90 to prevent movement of first drive chain 50, second drive chain 70, and linking member 90. In the illustrated embodiment, control assembly 100 includes a locking member 102 secured to frame 12 at inboard end 12a and movable with respect thereto. Locking member 102 is spring-biased into locking engagement with a locking hub 62 provided on top of first double sprocket 56 by a spring 108. Spring 108 extends between and contacts abutment member 112 at one end and slotted wall 114 of locking member 102 at the opposite end. Locking member 102 is further coupled to a control cable 104. Control cable 104 is retained at one end in a cavity 115 of locking member 102 adjacent slotted wall 114. Control cable 104 extends through slotted wall 114, spring 108, abutment member 112 and side rail 24. As it exits side rail 24, cable 104 is surrounded by an outer sleeve 110 and is coupled to a handle 106 at its opposite end. Handle 106 is preferably positioned near outboard end 12b of frame 12 for easy access by the operator of access system 10.

Locking member 102 is released from locking hub 62 by pulling on handle 106, thereby retracting cable 104 and locking member 102 in the direction of arrow R (see FIG. 10), and compressing spring 108. Handle 106 preferably includes a catch or the like that can be engaged by rotating handle 106 when locking member 102 is disengaged, allowing locking member 102 to be maintained in the disengaged position for manual deployment and stowing of ramp 20.

When locking hub 62 is engaged by locking member 102 (see FIG. 10) movement of first drive chain 50 prevented since first double sprocket 56 is locked. Movement of second drive chain 70 is also prevented because linking member 90 interconnects second double sprocket 76 with first double sprocket 56. This permits first drive motor 52 and second drive motor 72 to travel along fixed drive chain 50 and 70 respectively when motors 52 and 72 are powered on. When locking member 102 is disengaged from locking hub 62, however, drive chains 50 and 70 and linking member 90 are free to rotate about their respective sprocket wheels. The relative movement of drive chains 50 and 70 is coordinated by linking member 90 and allows manual movement of ramp 20 between the deployed and stowed positions. Reversing sprocket 78 is provided to reverse the direction of movement of second double sprocket 76 relative to second drive chain 70 when control assembly 100 is disengaged so that double sprockets 56 and 76 rotate in the same direction while drive chains 50 and 70 rotate in opposite directions. Linking member 90 is thus free to rotate about double sprockets 56 and 76 when control assembly 100 is disengaged allowing ramp 20 to be manually deployed and stowed within frame 12.

Access system 10 has a central axis A centrally positioned between side rails 24 and 26 of frame 12 and extending between inboard end 12a and outboard end 12b (FIGS. 6 and 7.) When control assembly 100 is engaged, linking member 90 ensures that both drive chains 50, 70 will not rotate so that each drive assembly 52 and 72 will move along a fixed chain. First drive assembly 14 and second drive assembly 16 are on opposite sides of axis A. Motors 52 and 72 of first and second drive assemblies 14 and 16 respectively are spaced generally the same distance from axis A. This configuration provides a concentric driving force to ramp 20 in the automatic mode to prevent ramp 20 from becoming misaligned or otherwise twisted in frame 12 as it moves between the stowed and deployed positions. Similarly, in the manual mode, when control assembly 100 is disengaged, linking member 90 rotates about double sprockets 56 and 76, and thereby coordinates the movement of first drive chain 50 with that of second drive chain 70. Linking member 90 ensures that ramp 20 will thus move an equal distance via each drive chain 50 and 70 during manual stowing and deployment of ramp 12. Furthermore, it is contemplated that if one of the drive motors 52 and 72 were to become inoperable, its respective drive gear could be designed to freewheel along the fixed chain while the operable motor deploys and stows ramp 20. This provides access system 10 with a redundant system for automatically driving the ramp between its stowed and deployed positions.

With reference to FIGS. 11–17 there will be described another aspect of the invention directed to a wheelchair ramp having side barriers. While the side barriers are described with reference to a vehicular access system like that of FIGS. 1–10, it should be understood that the principles associated with the side barriers of the present invention have application with other types of vehicular access systems for wheelchairs, including ramps and lifts. In FIGS. 11–17 there is illustrated vehicular access system 210 that, except as described below, is identical to vehicle access system 10 described above. As such, elements in FIGS. 11–17 identical to a corresponding element in FIGS. 1–10 are designated with the same reference numeral.

Referring now to FIGS. 11–14, access system 210 includes a ramp 220 extending between an inboard end 220a and an outboard end 220b. A first side barrier 280 extends along a first lateral edge or side of ramp 220 and a second side barrier 290 extends along a second lateral edge or side of ramp 220. Side barrier 280 has an inboard end 280a co-extensive with inboard end 220a of ramp 220 and an opposite outboard end 280b co-extensive with outboard end 220b of ramp 220. Similarly, side barrier 290 has an inboard end 290a co-extensive with inboard end 220a of ramp 220 and an opposite outboard end 290b co-extensive with outboard end 220b of ramp 220.

Figure 11:
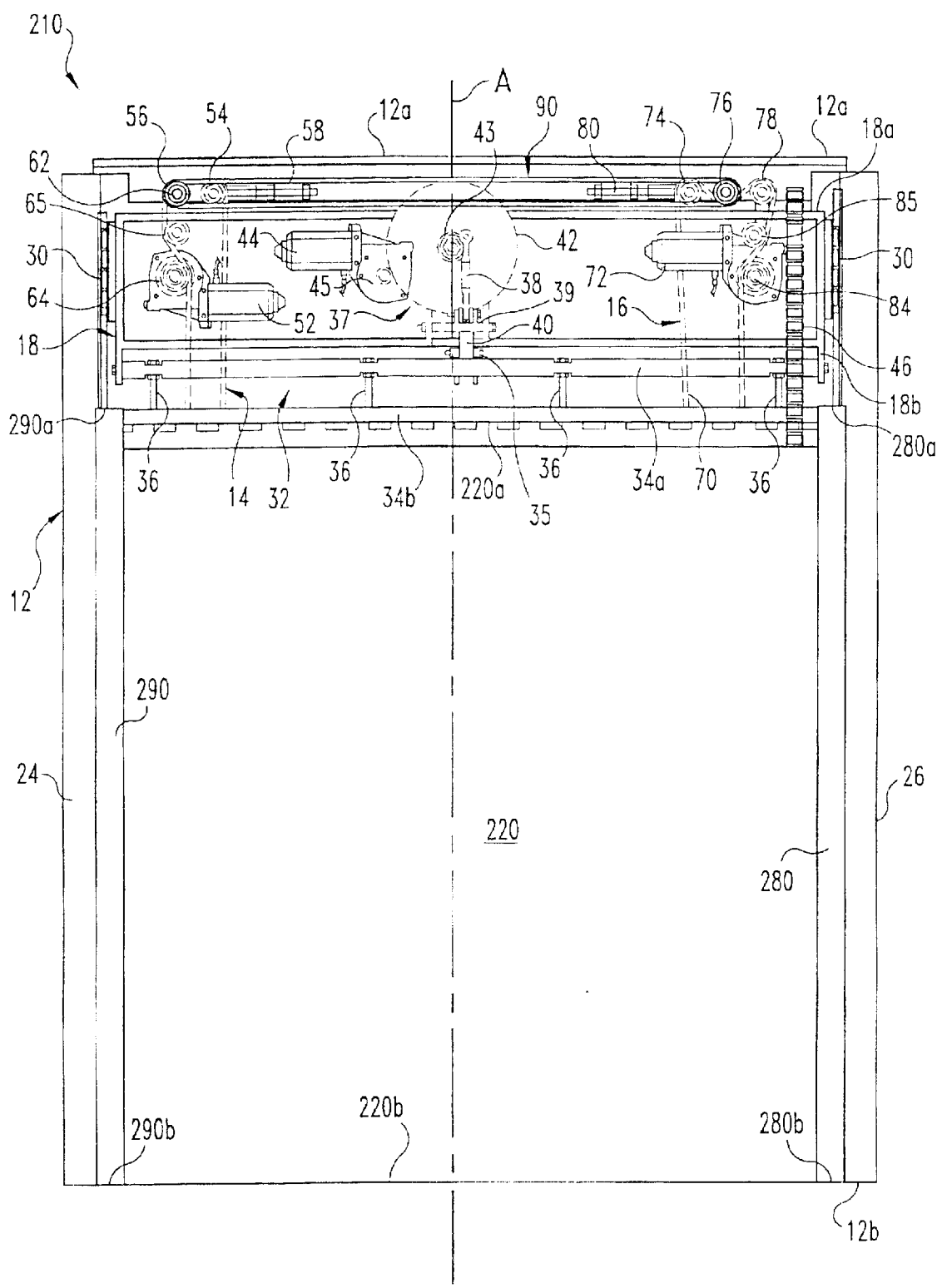
FIG. 11 is an enlarged top plan view of another vehicular access system having a ramp and side barriers depicted with the ramp and side barriers in a stowed low profile position in a frame.

In FIG. 11 ramp 220 is in its stowed position within side rails 24, 26 of frame 12 and side barriers 280, 290 are in their stowed orientation to form a low profile arrangement that allows the ramp and side barriers to fit in frame 12 beneath the floor of the vehicle. It is contemplated that side barriers 280, 290 are pivotally coupled along their respective lateral edge of ramp 220 with a spring hinge that biases the side barriers to their stowed orientation.

Figure 12:
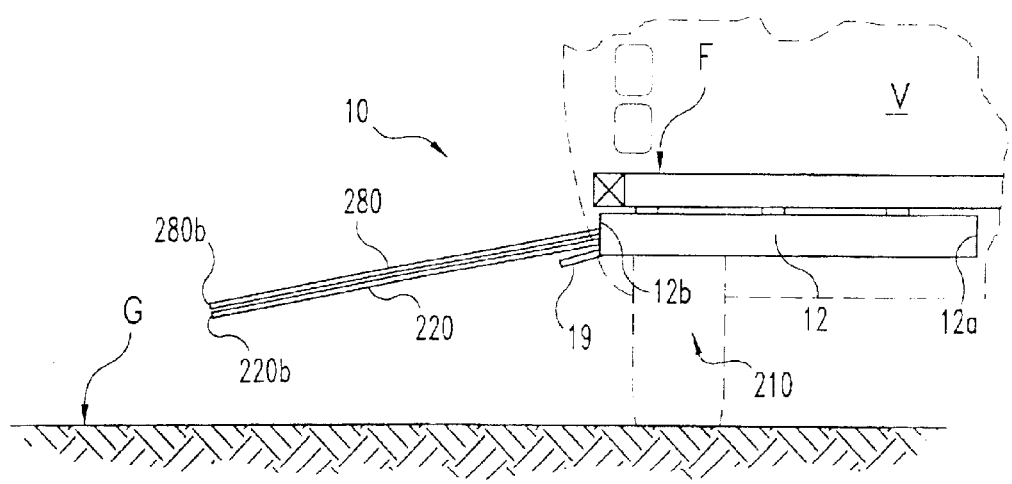
FIG. 12 is a side elevation view of the vehicular access system of FIG. 11 with the ramp partially extended from the vehicle and side barriers in the low profile orientation.
Figure 13:
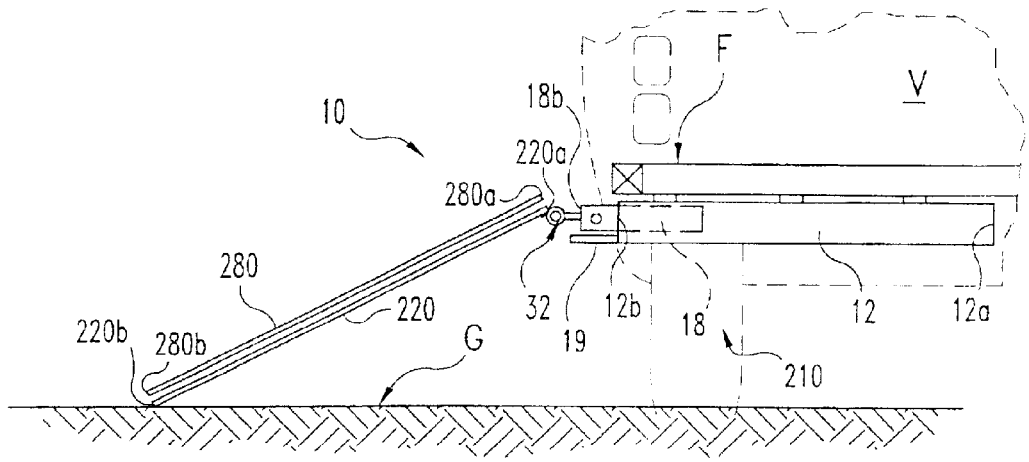
FIG. 13 is a side elevation view of the vehicular access system of FIG. 11 with the ramp fully extended from the vehicle in a deployed position and the side barriers in the low profile orientation.
Figure 14:
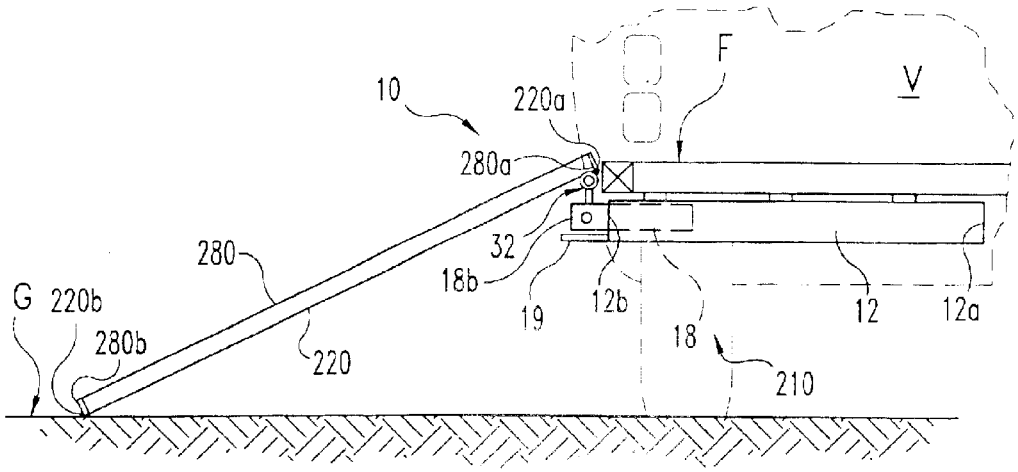
FIG. 14 is a side elevation view of the vehicular access system of FIG. 11 with the ramp in a vehicle floor level position and the side barriers in a raised safety barrier orientation.

In FIG. 12 ramp 220 is partially deployed from vehicle V, and first side barrier 280 and second side barrier (not shown) remain in their stowed orientation as ramp 220 is extended from frame 12. In FIG. 13, ramp 220 is in a deployed position extending from vehicle V and side barriers 280, 290 remain in or substantially in their stowed orientations. In FIG. 14, inboard end 220a of ramp 220 is raised to floor level F of vehicle V by rocker assembly 32 as discussed above. As described further below, actuators coupled to rocker assembly 32 contact respective ones of the side barriers 280, 290 as inboard end 220a is raised to the floor level position, pivoting side barriers 280, 290 to their raised safety barrier orientation with respect to ramp 220 as shown in FIG. 14. When inboard end 220a is lowered with rocker assembly 32, side barriers 280, 290 are spring biased to return toward their stowed orientation shown in FIGS. 11, 12 and 13.

Referring now to FIGS. 15 and 16, there is shown partial perspective views of rocker assembly 32 and a portion of ramp 220 connected therewith. Ramp 220 is shown in outline form in hidden lines so as to not obstruct the view of rocker assembly 32. In FIG. 15, rocker assembly 32 and ramp 220 are oriented with respect to one another such that inboard end 220a of ramp 220 is not raised to floor level F; i.e. ramp 220 is in the positions of FIG. 11, 12 or 13 and rocker assembly 32 is generally horizontally oriented. Rocker assembly 32 and ramp 220 are rotated in the direction of arrows R to arrive at the ramp/rocker assembly orientation of FIG. 16, wherein inboard end 220a is raised to floor level F and rocker assembly 32 is generally vertically oriented, as shown in FIG. 13.

Second rocker shaft 34b has a first actuator 250 fixedly coupled thereto and extending laterally from one end thereof, and a second actuator 260 fixedly coupled to and extending laterally the other end thereof. First actuator 250 and second actuator 260 move along with second rocker shaft 34b as it is raised from its position of FIG. 15 to its position of FIG. 16 by lifting mechanism 37. As such, actuators 250, 260 extend generally parallel to or in generally the same plane as rocker assembly 32 when ramp 220 is in its non-raised position of FIG. 15. When ramp 220 is raised to its FIG. 16 position, actuators 250, 260 follow the rotational movement of second rocker shaft 34b about first rocker shaft 34a and are thus oriented transversely to ramp 220 in a generally vertical orientation.

In FIG. 15, first side barrier 280 is in its stowed orientation and pivoted alongside the upper surface of platform 220 over first actuator 250 (not shown.) Second side barrier 290 is removed so second actuator 260 can be shown in its stowed orientation. Ramp 220 includes a recess or cutout 224 in a corner thereof extending partially or completely through ramp 220. Cutout 224 is sized to receive second actuator 260 therein so that second actuator 260 is recess below the upper surface of ramp 220 when in its stowed orientation. Similarly, first actuator 250 is positioned in cutout 222 of ramp 220 when in its stowed orientation. With actuators 250, 260 recessed at or below the upper surface of ramp 220, side barriers 280, 290 can be positioned adjacent to or in contact with the upper surface of ramp 220. Thus, ramp 220 and side barriers 280, 290 can assume a lower profile for stowage in frame 12 than would be possible if actuators 250, 260 were located between side barriers 280, 290 and ramp 220 when side barriers 280, 290 were in their stowed orientation.

In FIG. 16, rocker assembly 32 is rotatled by lift mechanism 37 to raise inboard end 220a of ramp 220 to the vehicle floor level. Actuators 250, 260 are rotated along with second rocker shaft 34b from their stowed orientation in cutouts 222, 224 and into contact with the adjacent side barrier 280, 290. As actuators 250, 260 are rotated to their vertical orientation, side barriers 280, 290 are pivoted about their hinged connection with the sides of ramp 220 from their stowed orientation to a raised safety barrier orientation in which side barriers 280, 290 are generally vertically and transversely oriented with respect to ramp 220, as shown by side barrier 280. It is contemplated that each actuator 250, 260 remains in contact with its adjacent side barrier 280, 290 to maintain it in the raised safety barrier orientation and resist its normally spring-bias return toward its stowed orientation. A number of hinged connections 270 along each side barrier are contemplated. Other mechanisms for pivotally connecting the side barriers to the sides of ramp 220 are also contemplated as would occur to those skilled in the art.

Referring now to FIGS. 17a–17d, actuators 250, 260 will be further described with reference to actuator 260, it being understood that actuator 250 is mirror image of actuator 260. Actuator 260 includes a first contact portion 262 located towards the center of ramp 220, and a second contact portion 264. Second contact portion 264 is located adjacent the pivotal connection between side barrier 290 and ramp 220. Side barrier 290 has a height L1 above ramp 220. In the illustrated embodiment, second contact portion 264 has a height above ramp 220 that is substantially the same as side barrier 290.

First contact portion 262 has a height L2 above ramp 220 that is greater than height L1. This allows first contact portion 262 to contact side barrier 290 before second contact portion 264 when actuator 260 is rotated with second rocker shaft 34b. Further, by offsetting first contact portion 262 toward the center of ramp 220, first contact portion 262 contacts side barrier 290 at a location spaced from its pivotal connection with ramp 220, thus creating a greater moment about the pivotal connection between side barrier 290 and ramp 220 than does second contact portion 264.

Figure 17A:
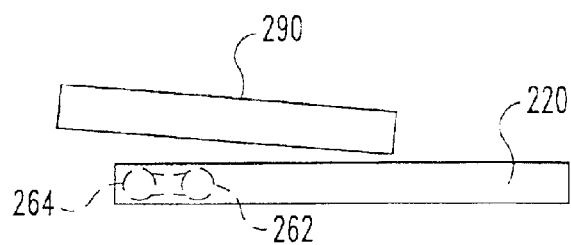
FIGS. 17a–17d illustrate the orientation between the ramp, actuator, and the side barrier in, respectively, a stowed orientation, a first partially pivoted side barrier position, a second partially pivoted side barrier position, and a raised safety barrier orientation.
Figure 17B:
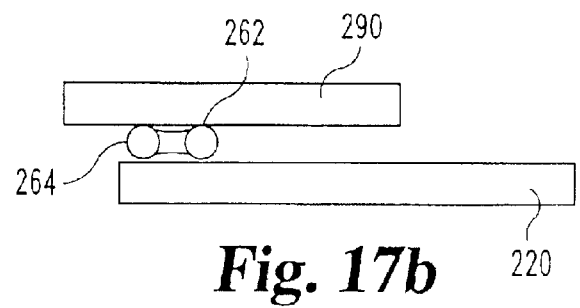

As shown in FIG. 17a, actuator 260 is recessed below the upper surface of ramp 220. In FIG. 17b, ramp 22 has been moved to its deployed position and can extend downwardly to the ground at an angle relative to rocker assembly 32. The pivoting of ramp 220 relative to rocker assembly 32 brings first contact portion 262 into contact with side barrier 290, but side barrier 290 is not pivoted sufficiently to interfere with movement of ramp 220 into and out of frame 12. The length and positioning of first contact portion 262, as discussed above, generates sufficient force to overcome the spring bias of side barrier 290 toward its stowed orientation and to initiate pivoting movement of side barrier 290 toward its raised safety barrier orientation.

Figure 17C:
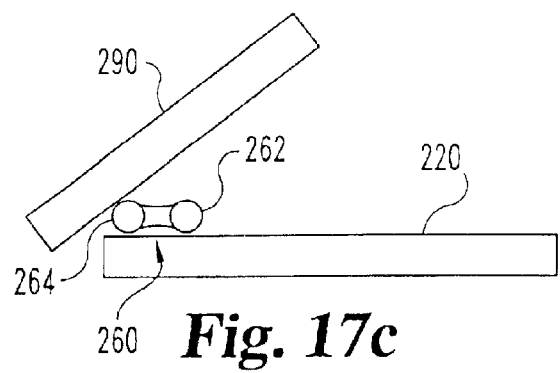
Figure 17D:
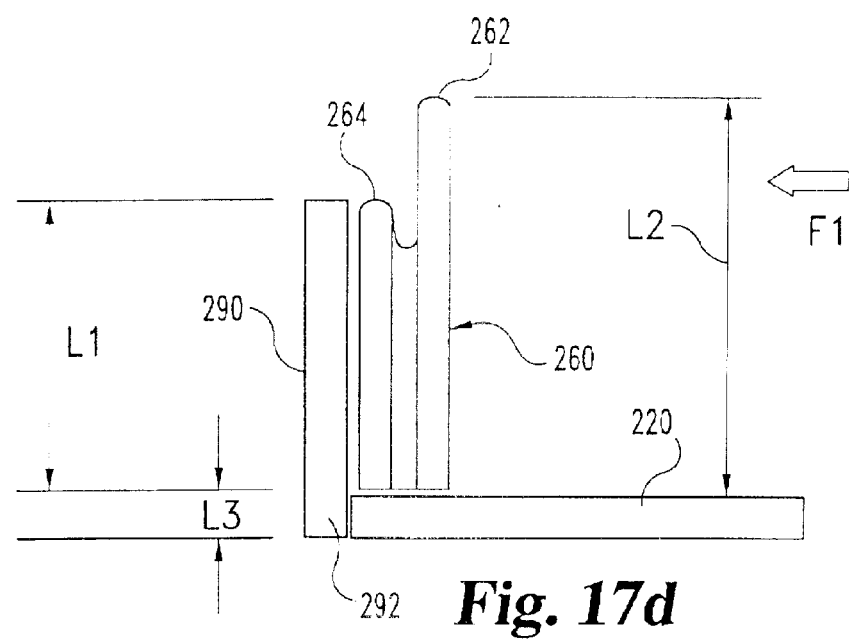

In FIG. 17c, rocker assembly 32 is being pivoted from, its horizontal orientation toward its vertical orientation to raise the inboard end of ramp 22 to the vehicle floor level. Side barrier 290 has been further pivoted toward its raised safety barrier orientation by actuator 260, and first contact portion 262 is no longer in contact therewith. Pivoting movement of side barrier 290 is further effected only by second contact portion 264, which thereafter remains in contact with side barrier 290 to maintain it in its raised safety barrier orientation, as shown in FIG. 17d. Actuators 250, 260 are preferably smooth and rounded to facilitate the sliding movement of the side barriers thereaalong.

Further shown in FIG. 17d, side barrier 290 has an overlap portion 292 that extends alongside ramp 220. This overlap 292 has a length L3 that corresponds to the thickness of ramp 220, and it is contemplated that overlap 292 can be in abutting contact with ramp 220 when side barrier 290 is in its raised safety barrier orientation. If a force indicated by arrow F1 were to contact side barrier 290, contact between overlap 292 and ramp 220 would assist the hinges or other pivotal connectors coupling side barrier 290 to ramp 220 in resisting counterclockwise rotation of side barrier 290. It should be understood that side barrier 280 can be similarly configured.

While the invention has been illustrated and described in detail in the drawings and foregoing description, the same are to be considered as illustrative and not restrictive in character. It should be understood that only the preferred embodiment has been shown and described and that all changes and modifications that come within the spirit of the invention are desired to be protected.

What is claimed is:

1. A vehicle access system, comprising:
   a frame including opposite first and second sides extending between an inboard end and an outboard end;
   a transfer member movably supported by the frame, the transfer member having an inboard end and an opposite outboard end;
   a first drive assembly positioned adjacent the first side of the frame;
   a second drive assembly positioned adjacent the second side of the frame;
   a linking member extending between and connecting the first drive assembly and the second drive assembly; and
   a control assembly engageable to at least one of the linking member, the first drive assembly and the second drive assembly, wherein the first drive assembly and the second drive assembly are operable simultaneously to move the transfer member with respect to the frame between a stowed position whereby the transfer member is positioned substantially in the frame and a deployed position whereby the transfer member extends outwardly from the frame, wherein the first drive assembly includes a first chain mounted to the frame and a first motor coupled to and movable along the first chain, and the second drive assembly includes a second chain mounted to the frame and a second motor coupled to and movable along the first chain.

2. The system of claim 1, wherein the transfer member is manually movable between the deployed and stowed positions when the control assembly is disengaged from the one of the linking member, the first drive assembly and the second drive assembly.

3. The system of claim 1, wherein the transfer member is manually movable between the deployed and stowed positions.

4. The system of claim 3, wherein the linking member includes a chain extending between and connecting the first drive assembly and the second drive assembly.

5. The system of claim 4, further comprising;
   a first double sprocket connecting the first chain of the first drive assembly and the chain of the linking member; and
   a second double sprocket connecting the second chain of the second drive assembly and the chain of the linking member.

6. The system of claim 5, wherein the control assembly includes a locking member selectively engageable to one the first and second double sprockets.

7. The system of claim 1, wherein:
   the first drive assembly includes a first outboard sprocket, a first inboard sprocket, and a first double sprocket; and
   the second drive assembly includes a second outboard sprocket, a second inboard sprocket, a reversing sprocket, and a second double sprocket between the second inboard sprocket and the reversing sprocket; and the linking member is connected to the first double sprocket and the second double sprocket.

8. The system of claim 1, wherein the linking member includes a chain extending between and connecting the first drive assembly and the second drive assembly.

9. The system of claim 1, further comprising a carriage attached to the inboard end of the transfer member and movable in the frame therewith, wherein the first drive assembly includes a first motor and the second drive assembly includes a second motor, the first motor and the second motor mounted in the carriage.

10. The system of claim 9, wherein:
the first drive assembly includes a first horizontal chain loop mounted to the frame with the first motor coupled thereto, the first horizontal chain loop being fixed and the first motor being movable along the first horizontal chain loop when the control member is engaged; and
the second drive assembly includes a second horizontal chain loop mounted to the frame with the second motor coupled thereto, the second horizontal chain loop being fixed and the second motor being movable along the second horizontal chain loop when the control member is engaged.

11. The system of claim 1, further comprising means for raising the inboard end of the transfer member when the transfer member is in the deployed position.

12. The system of claim 11, further comprising a carriage movable in the frame and attached to the inboard end of the transfer member, wherein the means for raising includes a rocker assembly pivotally attached to and extending between an outboard end of the carriage and the inboard end of the transfer member.

13. A vehicle access system, comprising:
a frame including opposite first and second sides extending between an inboard end and an outboard end;
a transfer member movably supported by the frame, the transfer member having an inboard end and an opposite outboard end;
a first drive assembly positioned adjacent the first side of the frame;
a second drive assembly positioned adjacent the second side of the frame;
a linking member extending between and connecting the first drive assembly and the second drive assembly; and
a control assembly engageable to at least one of the linking member, the first drive assembly and the second drive assembly, wherein the first drive assembly and the second drive assembly are operable simultaneously to move the transfer member with respect to the frame between a stowed position whereby the transfer member is positioned substantially in the frame and a deployed position whereby the transfer member extends outwardly from the frame, wherein the first drive assembly includes a first chain mounted to the frame and a first motor coupled to the first chain, the first chain being fixed and the first motor being movable along the first chain when the control member is engaged; and
the second drive assembly includes a second chain mounted to the frame and a second motor coupled to the second chain, the second chain being fixed and the second motor being movable along the second chain when the control member is engaged.

14. The system of claim 13, wherein the linking member includes a chain extending between and connecting the first drive assembly and the second drive assembly.

15. The system of claim 14, further comprising;
a first double sprocket connecting the first chain of the first drive assembly and the chain of the linking member; and
a second double sprocket connecting the second chain of the second drive assembly and the chain of the linking member.

16. The system of claim 15, wherein the control assembly includes a locking member selectively engageable to one the first and second double sprockets.

17. The system of claim 13, wherein:
the first drive assembly includes a first outboard sprocket, a first inboard sprocket, and a first double sprocket; and
the second drive assembly includes a second outboard sprocket, a second inboard sprocket, a reversing sprocket, and a second double sprocket between the second inboard sprocket and the reversing sprocket; and
the linking member is connected to the first double sprocket and the second double sprocket.

18. The system of claim 13, further comprising a carriage attached to the inboard end of the transfer member and movable in the frame therewith, wherein the first drive assembly includes a first motor and the second drive assembly includes a second motor, the first motor and the second motor mounted in the carriage.

19. The system of claim 18, wherein:
the first drive assembly includes a first horizontal chain loop mounted to the frame with the first motor coupled thereto, the first horizontal chain loop being fixed and the first motor being movable along the first horizontal chain loop when the control member is engaged; and
the second drive assembly includes a second horizontal chain loop mounted to the frame with the second motor coupled thereto, the second horizontal chain loop being fixed and the second motor being movable along the second horizontal chain loop when the control member is engaged.

20. The system of claim 13, further comprising means for raising the inboard end of the transfer member when the transfer member is in the deployed position.

21. The system of claim 20, further comprising a carriage movable in the frame and attached to the inboard end of the transfer member, wherein the means for raising includes a rocker assembly pivotally attached to and extending between an outboard end of the carriage and the inboard end of the transfer member.

22. A vehicle access system, comprising:
a frame including opposite first and second sides extending between an inboard end and an outboard end;
a transfer member movably mounted to the frame, the transfer member having an inboard end and an opposite outboard end;
a first drive assembly positioned along the first side of the frame, the first drive assembly including a first chain and a first motor coupled to the first chain;
a second drive assembly positioned along the second side of the frame, the second drive assembly including a second chain and a second motor coupled to the second chain; and
a linking member connected between the first drive assembly and the second drive assembly, wherein the first drive assembly and the second drive assembly are operable simultaneously to move the transfer member with respect to the frame between a stowed position whereby the transfer member is positioned substantially in the frame and an deployed position whereby the transfer member extends outwardly from the frame a control assembly selectively engageable to one of the linking member, the first drive and the second drive assembly, wherein the first motor is movable along the first chain and the second motor is movable along the second chain to move the transfer member between the deployed and stowed positions when the control member is selectively engaged to the one of the linking member, the first drive assembly and the second drive assembly.

23. The system of claim 22, wherein the transfer member is manually movable between the deployed position and the stowed position when the control assembly is not selectively engaged to the one of the linking member, the first drive assembly and the second drive assembly.

24. The system of claim 22, wherein the first chain forms a first loop and the second chain forms a second loop, the first loop and the second loop being oriented parallel to the transfer member.

25. The system of claim 22, wherein the linking member includes a chain extending along the inboard end of the frame and connecting the first drive assembly and the second drive assembly.

* * * * *